(12) United States Patent
Daneault et al.

(10) Patent No.: US 7,523,993 B1
(45) Date of Patent: Apr. 28, 2009

(54) PASSENGER DORSAL SUPPORT

(75) Inventors: Louis-Philippe Daneault, Montreal (CA); Marc-André Boudreau, Montreal (CA); Steve Beaulieu, Prevost (CA)

(73) Assignee: Nova Bus, Division de Groupe Volvo Canada Inc., Sainte-Eustache, Quebec (CA)

( * ) Notice: Subject to any disclaimer, the term of this patent is extended or adjusted under 35 U.S.C. 154(b) by 0 days.

(21) Appl. No.: 11/944,526

(22) Filed: Nov. 23, 2007

(51) Int. Cl.
*A47C 15/00* (2006.01)

(52) U.S. Cl. ............... 297/464; 297/232; 297/248; 297/183.6; 297/183.7; 244/118.5; 244/118.6

(58) Field of Classification Search ............... 297/464, 297/232, 244, 245, 248, 183.6, 183.7, 183.8
See application file for complete search history.

(56) References Cited

U.S. PATENT DOCUMENTS

| | | | | | |
|---|---|---|---|---|---|
| 1,005,542 | A | * | 10/1911 | Harmer ................ 248/425 X |
| 2,450,093 | A | * | 9/1948 | Richardson .......... 297/183.7 X |
| 3,029,106 | A | * | 4/1962 | McGuire ................ 297/311 |
| 3,124,329 | A | * | 3/1964 | Ransom et al. ............ 248/160 |
| 3,181,828 | A | * | 5/1965 | Cramer ................ 248/125.3 |
| 3,477,673 | A | * | 11/1969 | Bereday .................. 248/121 |
| 3,704,847 | A | * | 12/1972 | Schmitt .................. 248/127 |
| 3,720,394 | A | * | 3/1973 | Barrett et al. ............ 248/125.3 |
| 3,747,978 | A | * | 7/1973 | Barecki et al. ........ 297/183.8 X |
| 3,754,787 | A | * | 8/1973 | Garber ................ 297/487 X |
| 3,797,887 | A | * | 3/1974 | Barecki et al. .......... 297/232 X |
| 4,054,319 | A | * | 10/1977 | Fogg et al. ................ 297/466 |
| 4,077,664 | A | * | 3/1978 | Harder, Jr. ............... 297/183.8 |
| 4,088,367 | A | * | 5/1978 | Atkinson et al. ........ 267/232 X |
| 4,119,164 | A | * | 10/1978 | Fogg et al. ................ 180/6.5 |
| 4,120,533 | A | * | 10/1978 | Harder, Jr. ............ 297/232 X |
| 4,258,815 | A | * | 3/1981 | Wier et al. ............... 180/6.48 |
| 4,372,552 | A | * | 2/1983 | Carlmark ................ 482/143 |
| 4,390,076 | A | * | 6/1983 | Wier et al. ................ 180/11 |
| 4,437,537 | A | * | 3/1984 | Ausmus ................ 180/313 |
| 4,456,086 | A | * | 6/1984 | Wier et al. ................ 180/11 |
| 4,531,459 | A | * | 7/1985 | Yamada ................ 104/53 |
| 4,549,763 | A | * | 10/1985 | Wilkerson ............... 297/232 X |
| 4,700,632 | A | * | 10/1987 | Schmutz ................ 297/487 X |
| 4,776,635 | A | * | 10/1988 | Halliez .................. 297/440.15 |
| 4,787,675 | A | * | 11/1988 | McLeod .............. 297/423.1 X |
| 4,802,542 | A | * | 2/1989 | Houston et al. ............ 480/907 |
| 4,803,945 | A | * | 2/1989 | Adams et al. ............... 114/363 |
| 4,863,178 | A | * | 9/1989 | Friesen ................. 280/32.6 |
| 4,917,931 | A | * | 4/1990 | McDowell et al. ..... 297/183.8 X |
| 5,061,539 | A | * | 10/1991 | McDowell et al. ..... 297/183.7 X |
| 5,149,174 | A | * | 9/1992 | Charash ................ 248/125.1 |
| 5,199,763 | A | * | 4/1993 | Wilder et al. ............... 297/338 |

(Continued)

*Primary Examiner*—Rodney B White
(74) *Attorney, Agent, or Firm*—Ogilvy Renault LLP

(57) ABSTRACT

A dorsal support for supporting a passenger in a generally upright standing position while travelling in a public transportation vehicle is disclosed. The dorsal support comprises a body having a front surface extending uninterrupted upwardly from a base portion fastened to a floor surface, the front surface of the body including a planar lower portion preventing access behind the dorsal support from in front thereof and an upper portion which is integral with the lower portion and extends upwardly therefrom. The upper portion is rearwardly inclined and defines a passenger receiving area thereon for supporting at least a portion of the passenger's back such as to support the passenger in a generally upright standing position when leaning against the dorsal support.

17 Claims, 5 Drawing Sheets

U.S. PATENT DOCUMENTS

| | | | | |
|---|---|---|---|---|
| 5,265,689 A * | 11/1993 | Kauffmann | | 180/65.5 |
| 5,295,728 A * | 3/1994 | Schaevitz | | 297/195.1 |
| 5,303,981 A * | 4/1994 | Wilder et al. | | 297/338 |
| 5,364,151 A * | 11/1994 | Yurasits | | 296/65.09 |
| 5,366,036 A * | 11/1994 | Perry | | 180/65.1 |
| 5,489,258 A * | 2/1996 | Wohnsen et al. | | 602/5 |
| 5,591,208 A * | 1/1997 | Knutson | | 606/241 |
| 5,619,949 A * | 4/1997 | Dick, Jr. | | 114/363 |
| 5,784,983 A * | 7/1998 | Stegall | | 114/363 |
| 6,224,154 B1 * | 5/2001 | Stoki | | 297/465 |
| 6,467,728 B2 * | 10/2002 | Angerami et al. | | 244/118.5 |
| 6,620,051 B2 * | 9/2003 | Kroon et al. | | 472/31 |
| 6,637,341 B2 * | 10/2003 | Kroon et al. | | 104/53 |
| 6,692,076 B1 * | 2/2004 | Burer | | 297/464 X |
| 6,719,248 B2 * | 4/2004 | Lamont | | 248/121 |
| 6,799,798 B1 * | 10/2004 | Mandart et al. | | 197/183.6 |
| 7,100,991 B2 * | 9/2006 | Schroth | | 297/464 X |
| 7,340,784 B2 * | 3/2008 | Stryker et al. | | 5/81.1 HS |

* cited by examiner

PASSENGER DORSAL SUPPORT

TECHNICAL FIELD

The present invention relates generally to seat-like structures, and more particularly to a dorsal support for supporting a passenger in a generally upright standing position while travelling in a public transportation vehicle.

BACKGROUND OF THE INVENTION

Support structures which at least partially support a user's body weight while permitting them to maintain a generally upright standing position are used in a number of locations, however are most commonly employed in public transport vehicles, such as trains or buses for example, in order to provide at least a partial support for a passenger remaining in a generally upright standing position. These structures are used in place of more traditional seats in order to economize space and to permit a larger number of passengers to fit into a given area of the public transport vehicle.

Most of such known structures comprise a bar-like support structure which is mounted to the floor, ceiling and/or walls of the vehicle, and to which small seat pads are affixed. However, several disadvantages exist with these types of structures. The supporting bars provide an easily accessible structure upon which small children tend to climb, increasing the likelihood of an accident. Further, the relatively small pads of such structures, upon which the user is to lean, typically provide support only for the seat portion of the user. As such, they can be both uncomfortable and insufficiently supportive for many users.

Another disadvantage with these systems is that the seat pad is located on the bars of the support structure in a fixed position, and although the height thereof relative to the floor of the vehicle is chosen carefully such as to accommodate the largest number of passengers of varying sizes, it remains difficult to comfortably accommodate all users of all heights with such fixed small seat pads. Invariable, either very short or very tall users experience discomfort, as the fixed seat pads are not suitably located to support them comfortably in their upright positions.

Yet another disadvantage with such known structures is that the small supporting seat portion often leaves large areas of the floor and/or walls of the vehicle behind the seating structure exposed or readily accessible. As such, the walls behind the structure tend to experience wear and damage, whether unintentionally through use or intentionally through vandalism. This is particularly problematic for articulated buses. In such articulated buses, these types of passenger support structures are often provided in the central articulated portion itself, and as such the relatively fragile flexible accordion walls at this portion of the vehicle can become damaged from the feet of users standing in this region and when leaning against such support structures. Also, unfortunately, vandalism reduction/prevention is an important consideration when designing many public transit vehicles. The flexible accordion walls of articulated buses are particularly prone to damage by vandals, who have free access to the accordion walls either through or beneath such upright support structures located in the central articulated portion of these buses.

As such, there is a need for an improved structure for supporting a user in a generally upright standing position.

SUMMARY OF THE INVENTION

It is an object of the present invention to provide an improved structure for supporting a user in a generally upright standing position.

In accordance with one aspect of the present invention, there is provided a dorsal support for supporting a passenger in a generally upright standing position while travelling in a public transportation vehicle, the dorsal support comprising a base portion which is removably fastenable directly to a supporting floor of the vehicle, and a body including at least a solid front surface extending uninterrupted upwardly from the base portion to a top edge of the dorsal support, the front surface of the body including a planar lower portion preventing access behind the dorsal support from in front thereof and an upper portion which is integral with the lower portion and extends upwardly therefrom, at least the upper portion being rearwardly inclined at an angle relative to a vertical reference plane which is perpendicular to the supporting floor, the upper portion defining a passenger receiving area thereon having a passenger abutting surface adapted to receive at least a portion of the passenger's back thereagainst such as to support the passenger in a generally upright standing position when leaning against the dorsal support.

There is also provided, in accordance with another aspect of the present invention, a dorsal support assembly for supporting passengers in a generally upright standing position while travelling in a public transportation vehicle, the dorsal support comprising a moulded body having two passenger receiving areas located side by side thereon for supporting two passengers on the dorsal support assembly, the body being removably fastenable directly to a supporting floor of the vehicle, the body including at least a front surface extending uninterrupted upwardly from a base edge adjacent the supporting floor to a top edge of the dorsal support, the front surface of the body including a lower portion preventing access behind the dorsal support from in front thereof and an upper portion which is integral with the lower portion and extends upwardly to said top edge, at least the upper portion being rearwardly inclined, the passenger receiving areas each defining a passenger abutting surface adapted to receive at least a portion of the passenger's backs thereagainst such as to support the two passenger in a generally upright standing position when leaning against the dorsal support.

BRIEF DESCRIPTION OF THE DRAWINGS

Further features and advantages of the present invention will become apparent from the following detailed description, taken in combination with the appended drawings, in which.

DETAILED DESCRIPTION OF A PREFERRED EMBODIMENT

Figure 1:
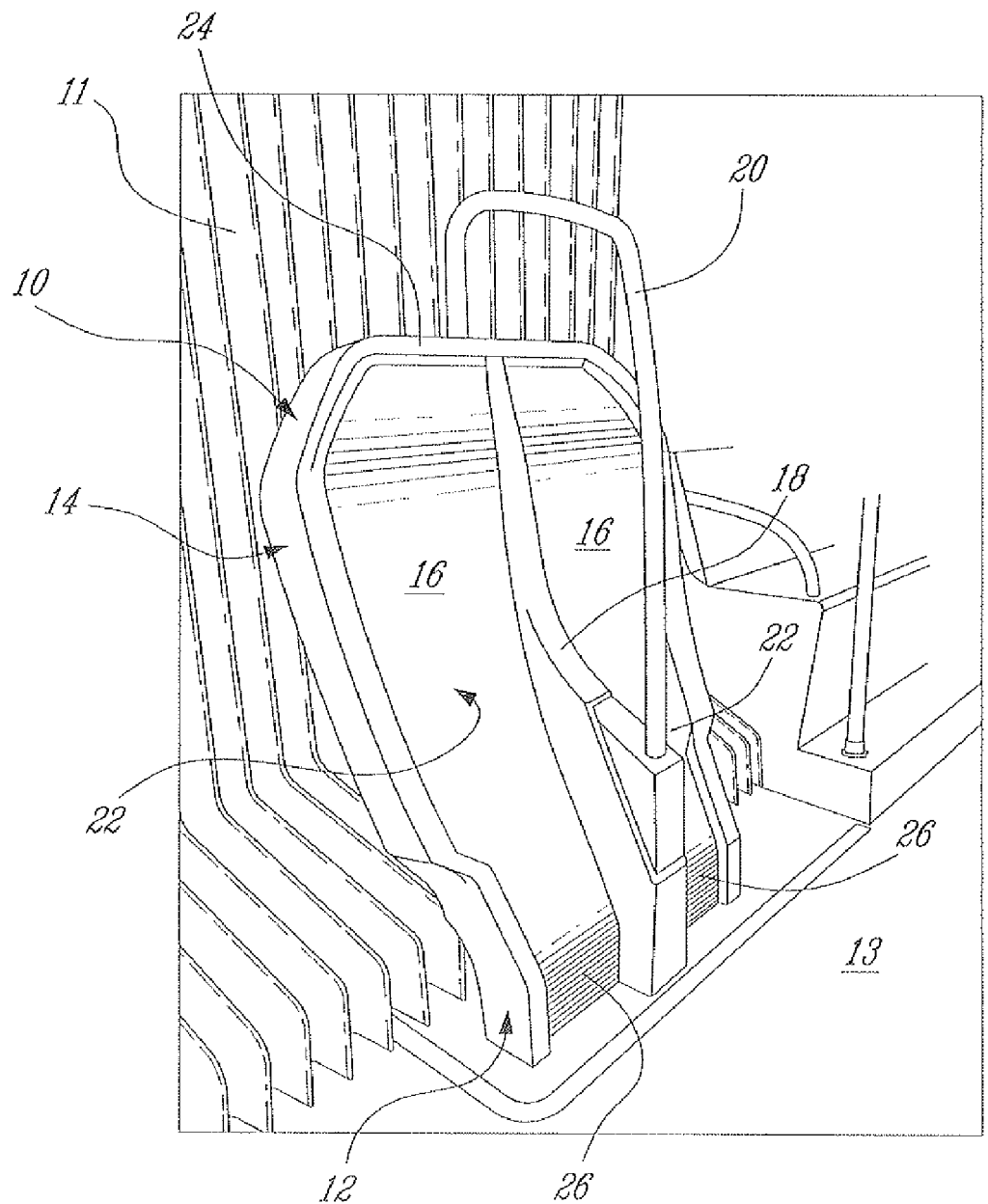
FIG. 1 is a perspective view of a dorsal support in accordance with one embodiment of the present invention, shown installed within an articulated bus.
Figure 2:
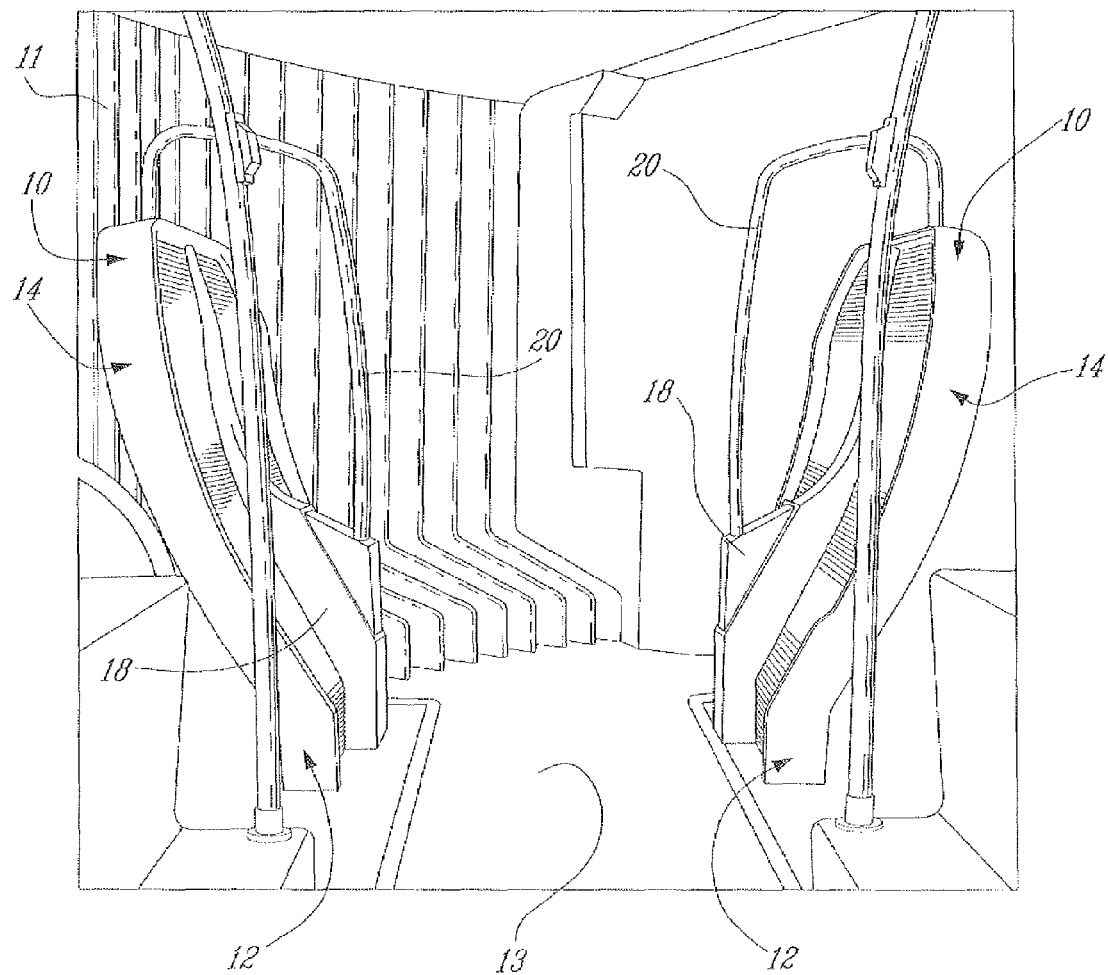
FIG. 2 is a perspective view of a portion of the interior of the articulated bus of FIG. 1, having two of the present dorsal supports mounted opposite each other in the central articulated portion of the bus.

Referring to FIGS. 1 to 2, a dorsal support 10 in accordance with one embodiment of the present invention is shown mounted within a public transportation vehicle such as a bus for example. The dorsal support 10 is used for supporting a passenger in a generally upright standing position while travelling in the vehicle. More specifically, passengers are able to lean against the dorsal support 10 while nevertheless remaining generally upright, such as to make a trip more comfortable for a passenger having to stand within the vehicle. The passenger dorsal support 10 may be used in a number of public transportation vehicles, such as buses, subways, trains, light rail cars, etc. One particular use for the dorsal support 10 is in an articulated bus, wherein the central articulated portion at the middle of the vehicle provides a passageway through which passengers must be able to pass while nevertheless being able to accommodate a number of standing passengers during crowded journeys. It is common for passengers to have to stand within this central rotating articulated portion of such an articulated bus. The dorsal support 10 therefore provides a support structure against which such passengers can lean in order to partially support themselves while remaining substantially upright and standing on the floor of the vehicle within the central articulated portion. As it would be impossible to fit full seats within such confined spaces, particularly in articulated buses, supports for standing passengers present a useful compromise between comfort and safety of the passengers, while accommodating more passengers in relatively confined space.

The dorsal support assembly 10 generally includes a base portion 12 which is fastened directly to the supporting floor 13 of the vehicle and an upper body portion 14 which in the depicted embodiment includes two side-by-side passenger receiving areas 6 separated by a small divider 18 to which is mounted a hand rail 20 that is within reach of both passengers when leaning against the dorsal support with their backs in contact with the passenger receiving area 16. The base portion 12 of the dorsal support 10 is preferably removably fastened to the floor, such that the entire dorsal support 10 can be removed if necessary, such as for maintenance purposes.

The body 14 of the dorsal support includes at least a solid front surface 22 which extends uninterrupted upwardly from the base portion 12 to a top edge 24 of the dorsal support 10. This front surface 22 includes at least a planar solid lower portion 26 proximate the base 12 of the structure, the planar lower portion 26 preventing access to behind the dorsal support from in front thereof. Therefore, the user's feet which are proximate this planar lower portion 26 when leaning on the dorsal support cannot extend beneath, or easily extend around, this lower portion 26 of the support's body 14 and as such are prevented from coming into contact with the vehicle's wall located behind the dorsal support 10. This is particularly important when the dorsal support 10 is mounted adjacent the flexible walls 11 of an articulated bus, which can be prone to wear and tear and/or the damage which could otherwise be caused unintentionally by the user's feet contacting this flexible wall surface. As access to the flexible wall of the bus located behind the dorsal support 10 limited, this also helps to reduce vandalism to such flexible walls as access to the wall behind the dorsal support 10 is restricted.

As seen in FIG. 2, when employed in a central rotating articulation portion of an articulated bus, two dorsal support assemblies 10 are preferably disposed opposite each other adjacent each of the opposed flexible walls 11 of the bus. Each of the dorsal support assemblies 10 are bolted or otherwise fastened to the floor portion 13, which rotates relative to one of the portions of the articulated bus. The handrails 20 of each of the dorsal supports 10 can also be used, when two such dorsal supports 10 are arranged in this configuration, by other passengers whom may have to stand within this portion of the bus between the two dorsal support assemblies 10 in addition to those passengers leaning against the dorsal supports. As such, a large number of passengers can be accommodated within a relatively confined space, with two of these passengers being able to lean against, and therefore be supported by, each of the dorsal support assemblies 10. While the dorsal support assemblies 10 as depicted and described herein generally relate to an assembly having two passenger receiving areas 16 on each assembly, i.e. such that each structure can accommodate two passengers, alternate dorsal support structures can also be provided whereby each dorsal support assembly accommodates only one, or alternatively more than two, passengers thereon.

Figure 3:
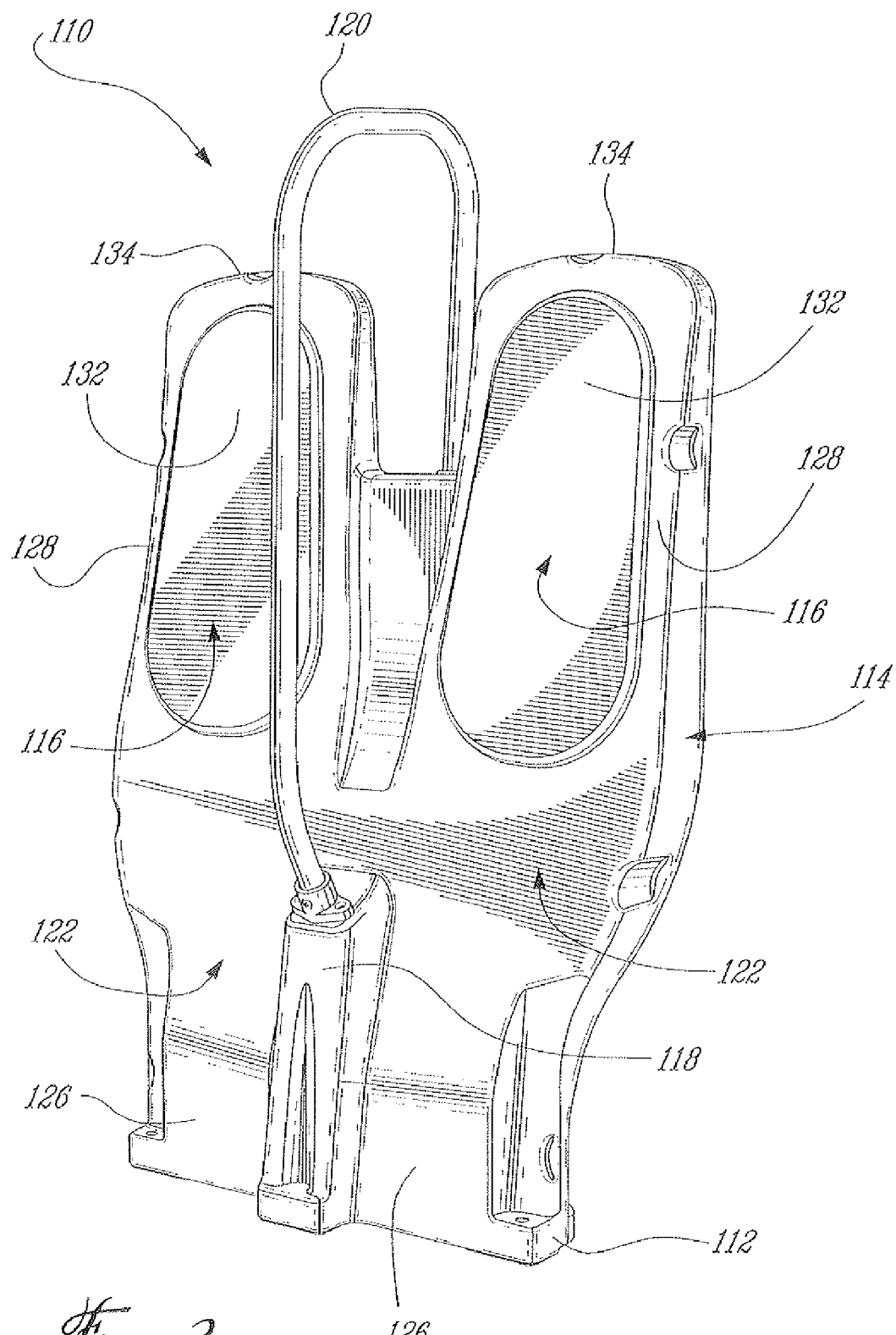
FIG. 3 is a perspective view of a dorsal support in accordance with another embodiment of the present invention, shown in isolation.
Figure 4:
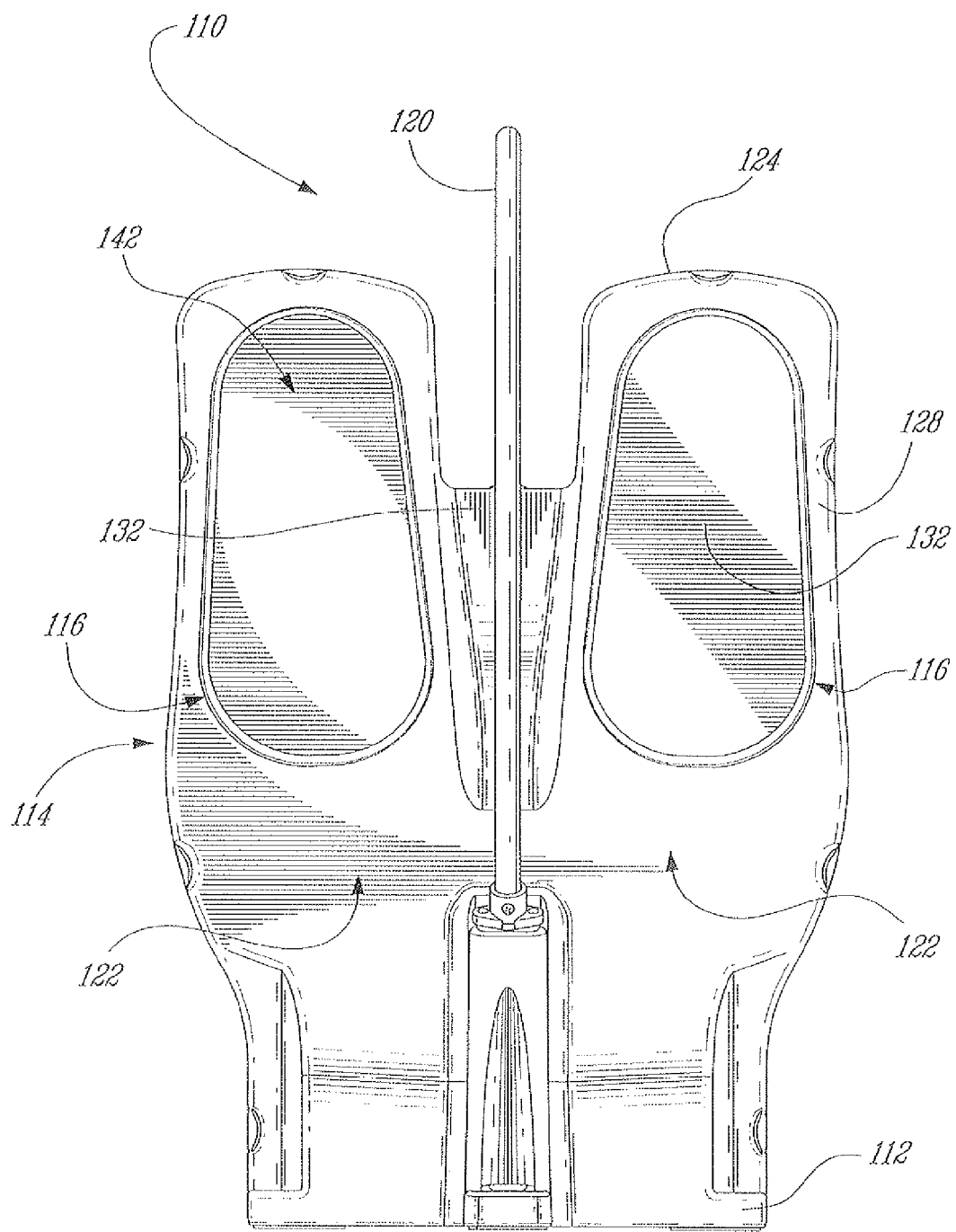
FIG. 4 is a front elevation view of the dorsal support of FIG. 3.
Figure 5:
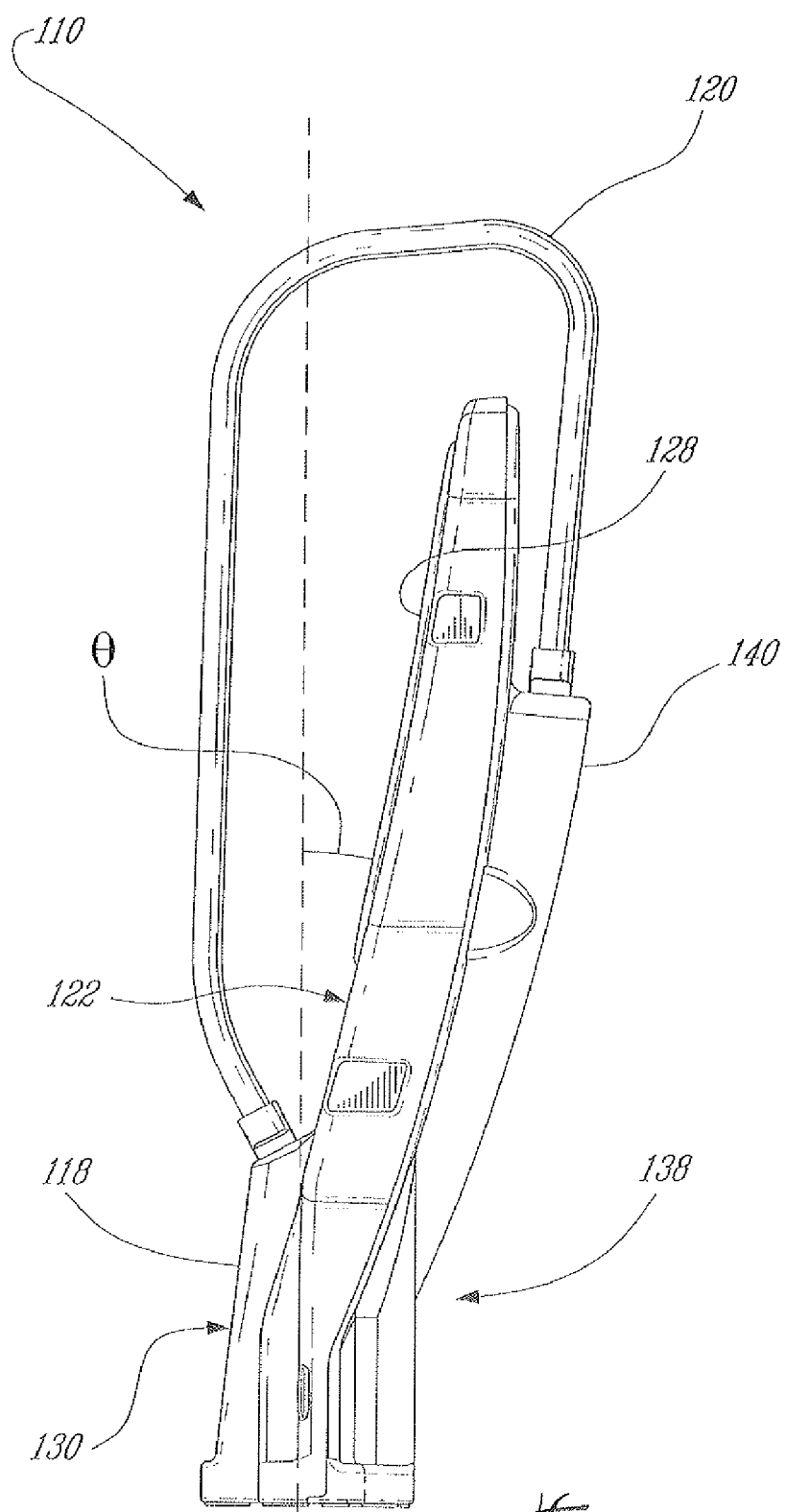
FIG. 5 is a side elevation view of the dorsal support of FIG. 3.

Referring now to FIGS. 3 to 5, a dorsal support assembly 110 is shown in accordance with another embodiment wherein two passengers can be accommodated side-by-side on the assembly. As noted above, the dorsal support 110 includes a base 112 which is removably fastenable directly to a supporting floor of the vehicle and an upper body portion 114 having a solid front surface 122 that extends uninterrupted and upwardly from the base portion 112 to a top edge 124 of the dorsal support. The front surface 122 of the body 114 includes a planar lower portion 126 that prevents access behind the dorsal support from in front thereof and an upper portion 128 which is integral with the lower portion 126 and extends upwardly therefrom. At least the upper portion 128 is rearwardly inclined at an angle θ relative to a vertical reference plane 30, as best seen in FIG. 5. The vertical reference plane 30 may be perpendicular to the supporting floor of the vehicle within which the dorsal support 110 is installed. This angle θ is preferably relatively small, permitting a relatively small rearward incline to at least the upper portion 128 of the front surface 122. This permits a user to comfortably lean back against the dorsal support structure while nevertheless remaining in a generally upright standing position. Thus, the dorsal support can take at least some load off of the user when he or she is leaning thereagainst, making a voyage more comfortable than if the passenger was simply standing. The rearward inclination angle θ may be between about 5° and 20°. More specifically, θ is more preferably between 10° and 15° and in at least one specific embodiment, θ is between 10° and 12° relative to the reference plane 30. The upper portion 128 of the body 114 includes a passenger receiving area 116 thereon having a passenger abutting surface 132 against which at least a portion of a passenger's back is abutted when leaning back against the dorsal support 110. The handrail 120 is preferably mounted at a lateral or transverse midpoint of the entire dorsal support structure 110, such that each of the passengers, when in position leaning against the two passenger receiving areas 16, is able to easily grab hold of the handrail 20 such that they can comfortably hold themselves in place when leaning back against the dorsal support. As best seen in FIG. 5, the handrail preferably is fixed on a front side of the structure to a point on the central column or divider 118, and extends upward, in front of the passenger abutting surface 132, to a point higher than the top edge 124, and then extends behind the structure before being fastened at a rear side of the structure to the central spine 140. A central recess 134 is formed between the two passenger receiving areas 116 in order to provide added elbow room for the two passengers when in position against the dorsal support assembly 110.

In the embodiment of FIGS. 3 to 5, each of the two passenger receiving areas 116 are defined by a replaceable insert 142 is provided on the upper portion 114 of the body. The replaceable inserts 142 define the passenger abutting surface 132 thereon, and may be made of the same or a different material from the rest of the body. These replaceable inserts 142 can for example be provided with additional padding such as to make leaning thereagainst more comfortable, and may be made of a different colour from the rest of the body such as to improve the overall aesthetics of the device.

In one embodiment, the entire body of the dorsal support 10, 110 is made from at least one moulded non-metallic material. Preferably, the entire body of the dorsal support is made of fibreglass and/or a plastic or composite plastic. In the embodiment of FIGS. 3-5, the body 114 of the dorsal support 110 is formed by two moulded halves, namely a front half 136 and a rear half 138 which, once moulded, are fastened together in order to form a substantially hollow rigid body. The rear half 138 of the moulded body includes in this embodiment a vertically extending spine 140 which is laterally centrally located on the rear of the dorsal support 110, and provides increased overall rigidity to the structure.

Although the handrail 20,120 may be made of a metallic material, such as stainless steel for example, no other metal is preferably used in the rest of the dorsal support assembly 10,110, with the moulded body being made of fibreglass for example. Several advantages exist with the use of fibreglass only in order to make up the entire structure of the dorsal support. For example, the ability to add a natural colour in the production process is relatively easy, making improving the overall aesthetic appeal of the dorsal support simpler and more cost effective. Also, the fibreglass body of the dorsal support 10,110 is relatively resistant to vandalism, which unfortunately is a design consideration for structures going within public transportation vehicles. Further, the non-metallic nature of the fibreglass body means that corrosion will not occur when the dorsal support is employed in vehicles used in inclement climates. The dorsal support 10,110 is therefore easy to maintain and clean, which is not true of many prior art structures. The handrail 20,120, while providing an element to which passengers can grab hold during use of the dorsal support, does not provide any structural integrity to the overall assembly and is therefore not a structural member of the device. For example, the handrail 20,120 could be removed in favour of other types of handgrips, without sacrificing the strength and rigidity of the rest of the body of the dorsal support. Further, even when the handrail 20,120 is employed, relatively few elements are provided which can be used by children who may attempt to climb up upon the dorsal support assembly 10,110. This is a significant improvement over many of the prior art structures, which comprise a plurality of posts, rails, etc. which are mounted either horizontally or vertically and supported by being mounted to the wall or floor, and upon which children can readily climb.

The embodiments of the invention described above are intended to be exemplary. Those skilled in the art will therefore appreciate that the forgoing description is illustrative only, and that various alternatives and modifications can be devised without departing from the spirit of the present invention. Accordingly, the present is intended to embrace all such alternatives, modifications and variances which fall within the scope of the appended claims.

The invention claimed is:

1. A dorsal support for supporting a passenger in a generally upright standing position while travelling in a public transportation vehicle, the dorsal support comprising a base portion which is adapted to be removably fastened directly to a supporting floor of the vehicle, and a body including at least a solid front surface extending uninterrupted upwardly from the base portion to a top edge of the dorsal support, the front surface of the body including a planar lower portion preventing access behind the dorsal support from in front thereof and an upper portion which is integral with the lower portion and extends upwardly therefrom, at least the upper portion being rearwardly inclined at an angle relative to a vertical reference plane which is perpendicular to the supporting floor, the upper portion defining a passenger receiving area thereon having a passenger abutting surface adapted to receive at least a portion of the passenger's back thereagainst such as to support the passenger in a generally upright standing position when leaning against the dorsal support, wherein the entire dorsal support is made of at least one moulded non-metallic material, and wherein at least the body of the dorsal support is formed from front and rear moulded halves fastened together to form a hollow rigid body.

2. The dorsal support as defined in claim 1, wherein the upper portion defines two passenger receiving areas, each having one of said passenger abutting surfaces, such that the dorsal support can support said two passengers leaning thereagainst.

3. The dorsal support as defined in claim 2, wherein a hand rail is mounted to said body between said two passenger receiving areas, within reach of said two passengers when leaning against the dorsal support.

4. The dorsal support as defined in claim 3, wherein the hand rail is disposed at a lateral midpoint of the dorsal support.

5. The dorsal support as defined in claim 1, wherein a hand rail is mounted to said body within reach of the passenger when leaning against the dorsal support.

6. The dorsal support as defined in claim 1, wherein the angle is between about 5 and 20 degrees.

7. The dorsal support as defined in claim 6, wherein the angle is between about 10 and 15 degrees.

8. The dorsal support as defined in claim 7, wherein the angle is between about 10 and 12 degrees.

9. The dorsal support as defined in claim 1, wherein said material includes at least one of fibreglass and plastic.

10. The dorsal support as defined in claim 1, wherein the rear moulded half of the body includes a vertically extending spine integrally formed therein to provide increased structural rigidity.

11. The dorsal support as defined in claim 1, wherein the upper portion includes a replaceable insert within said passenger receiving area, said replaceable insert having said passenger abutting surface thereon.

12. A dorsal support assembly for supporting passengers in a generally upright standing position while travelling in a public transportation vehicle, the dorsal support comprising a moulded body having two passenger receiving areas located side by side thereon for supporting two passengers on the dorsal support assembly, the body being formed from front and rear moulded halves fastened together to form a hollow rigid body, the body being adapted to be removably fastened directly to a supporting floor of the vehicle, the front moulded half of the body including at least a front surface extending uninterrupted upwardly from a base edge adjacent the supporting floor to a top edge of the dorsal support, the front surface of the body including a lower portion preventing access behind the dorsal support from in front thereof and an upper portion which is integral with the lower portion and extends upwardly to said top edge, at least the upper portion being rearwardly inclined, the passenger receiving areas each defining a passenger abutting surface adapted to receive at least a portion of the passenger's backs thereagainst such as to support the two passenger in a generally upright standing position when leaning against the dorsal support.

13. The dorsal support assembly as defined in claim 12, wherein the upper portion of the body is rearwardly inclined at an angle of between about 10 and 15 degrees relative to a vertical reference plane which is perpendicular to the supporting floor.

14. The dorsal support assembly as defined in claim 12, wherein a hand rail is mounted to said body between said two passenger receiving areas, within reach of said two passengers when leaning against the dorsal support.

15. The dorsal support assembly as defined in claim 12, wherein the moulded body is made of at least one non-metallic material.

16. The dorsal support assembly as defined in claim 15, wherein said material includes at least one of fibreglass and plastic.

17. The dorsal support assembly as defined in claim 12, wherein the rear moulded half includes a central, vertically extending spine integrally formed therein to provide increased structural rigidity to the dorsal support assembly.

* * * * *